United States Patent [19]
Kielczewski

[11] 3,711,064
[45] Jan. 16, 1973

[54] PIPE PUSHER

[76] Inventor: John J. Kielczewski, 4018 Zuck Road, Erie, Pa. 16506

[22] Filed: Feb. 1, 1971

[21] Appl. No.: 111,191

[52] U.S. Cl. ............................................... 254/29 R
[51] Int. Cl. ............................................. E21b 19/00
[58] Field of Search....254/29 R, 30, 31, 93; 61/72.5; 94/33

[56] References Cited

UNITED STATES PATENTS

| 3,358,966 | 12/1967 | Bergstrom | 254/29 R |
| 2,991,974 | 7/1961 | Bingham | 254/29 R |

*Primary Examiner*—Othell M. Simpson
*Attorney*—Charles L. Lovercheck

[57] ABSTRACT

A pipe pusher made up of two parallel side members defining a space therebetween, spacers holding the side members in spaced relation with each other, parallel opposed slots on the inner sides of said frames, a cylinder backup member adapted to be removably received in each pair of said slots, the hydraulic cylinder having one end connected to said backup plate and its piston rod connected to means for connecting to a pipe to be pushed. The frames have a wall engaging member on one end so that when the pipe is connected to said piston rod and said plate engages a vertical wall, the pipe may be pushed through ground such as under driveways and the like.

5 Claims, 13 Drawing Figures

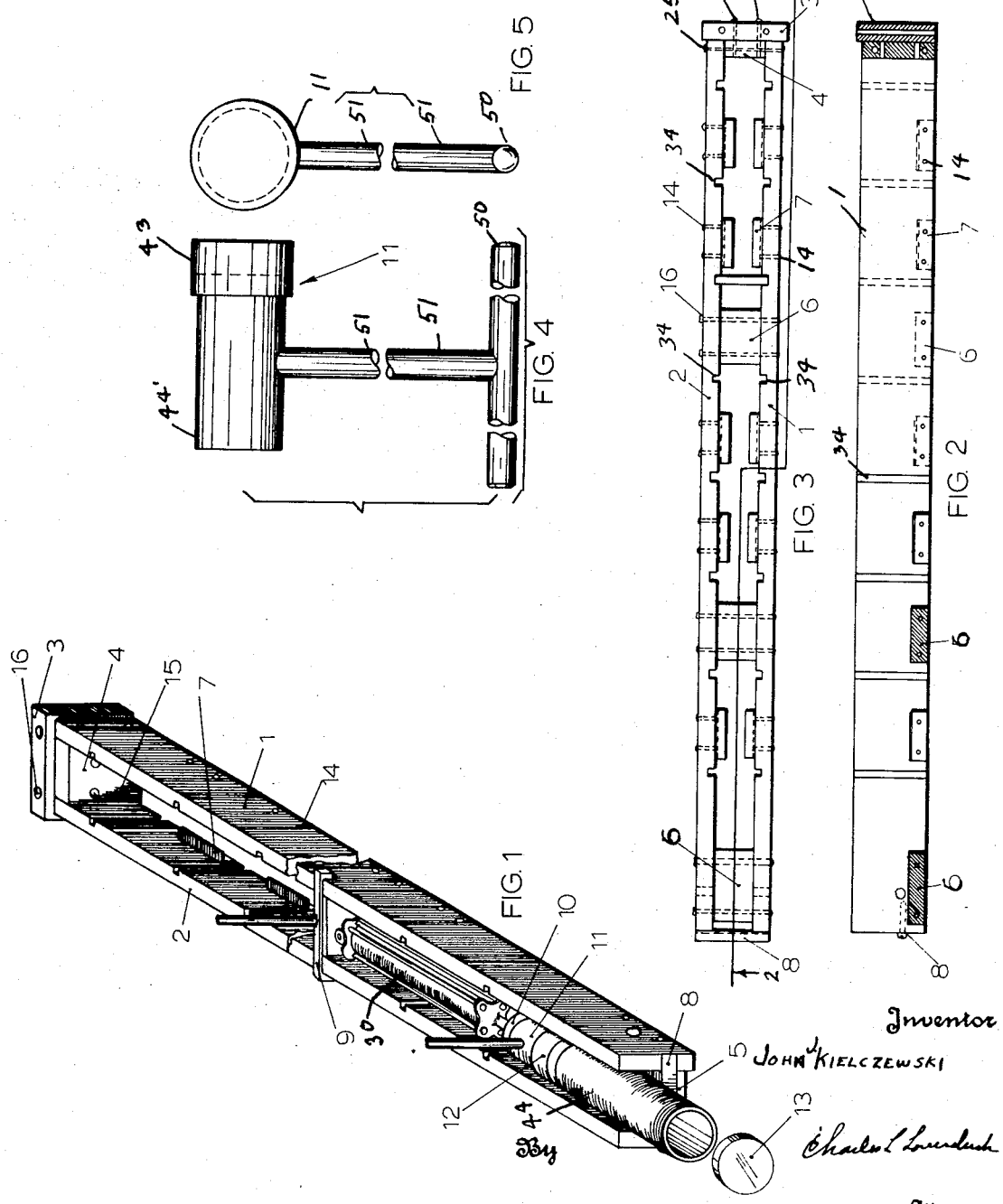

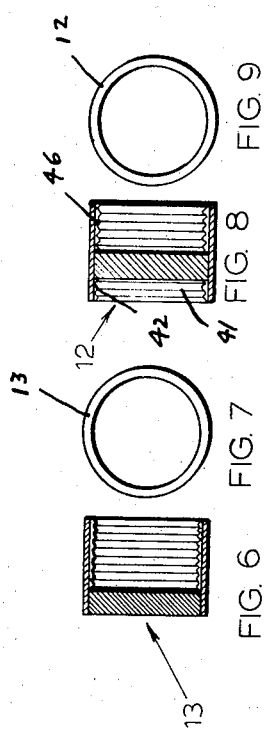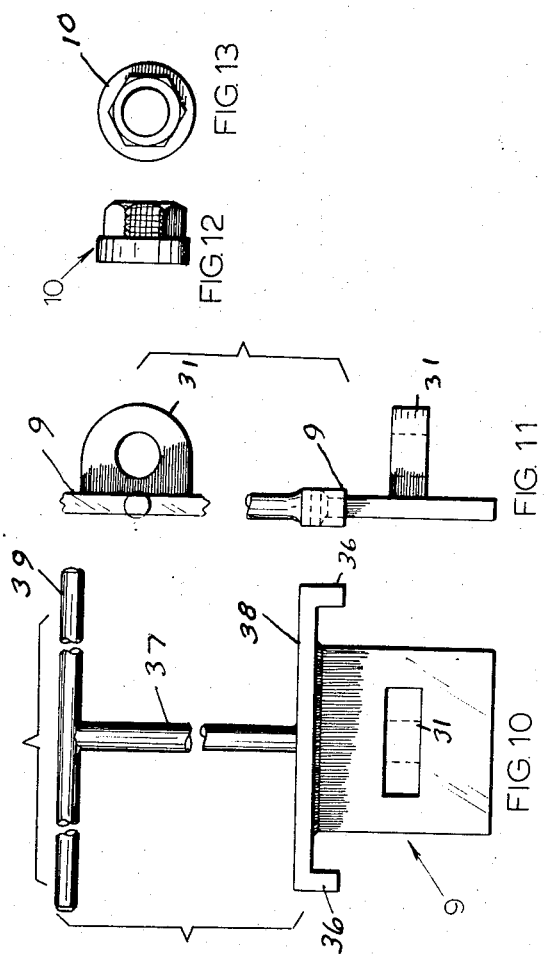

PIPE PUSHER

OBJECTS OF THE INVENTION

It is an object of the invention to provide an improved pipe pusher for pushing pipe conduits and the like through earth as in installing a pipe under a driveway along a street or a road.

Another object of the invention is to provide an improved pipe pusher.

Another object of the invention is to provide a pipe pusher that is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

DESCRIPTION OF THE DRAWINGS

FIG. 1 is a isometric view of the pipe pusher according to the invention.

FIG. 2 is a longitudinal cross sectional view of the frame of the pipe pusher taken on line 2—2 of FIG. 3.

FIG. 3 is a top view of the frame of the pipe pusher.

FIG. 4 is a side view of the cylinder push guide.

FIG. 5 is an end view of the cylinder push guide.

FIG. 6 is a side view of the pipe pusher coupling.

FIG. 7 is an end view of the pipe pusher coupling.

FIG. 8 is a side view of the pipe backup coupling.

FIG. 9 is an end view of the pipe backup coupling.

FIG. 10 is an end view of the pipe backup plate.

FIG. 11 is a side view of the pipe backup plate.

FIG. 12 is a side view of the cylinder push coupling.

FIG. 13 is an end view of the cylinder push coupling.

DETAILED DESCRIPTION OF THE DRAWINGS

Now with more particular reference to the drawings, the pipe pusher has side frames which may be made of hard wood or the like and which are held in parallel spaced relation to each other by spacers 6 which extend between the side frames at the lower part thereof. The frame members are held together by means of through bolts 16.

The side frame members 1 and 2 are also held together at one end by the block 3 and block 4. Block 4 is sandwiched between the two frame members 1 and 2 and held in place by means of bolts 25. The block 3 is held to block 4 by bolts 26.

An angle iron pipe rest 8 is attached to the frame members 1 and 2 by means of bolts and support angles 7 are attached to the sides of the frame members by means of bolts 14.

The angles 7 help support the cylinder 30. The cylinder 30 is a double acting hydraulic cylinder ans has its one end fixed to the lug 31 of the cylinder backup plate 9. The cylinder backup plate 9 has a platelike portion which has side edges that may be selectively received in the parallel slots 34 in the side members 1 and 2. The plate may have cross member 38 fixed to it with downwardly extending ears 36 which overlie the edges of the side frame members 1 and 2 and limit the downward movement of the backup plate and guide the plate 9 along the frame member. A rod 37 is fixed to the upper side of the bar at 38 and a handle 39 is fixed to the rod 37 by which the plate may be lifted and moved to another slot 34 as the pipe advances.

The cylinder push coupling 10 is fixed to the piston rod of cylinder 30 and push coupling 10 is received in the internal threads in pipe backup coupling 12. Pipe backup coupling has a partition 41 in it and threaded end 42 may threadably receive the rear end of pipe 49 to be pushed. The cylinder push guide 11 may be used as a spacer to get additional movement of the pipe without resetting backup plate 9. Cylinder push guide 11 has an enlarged end 43 which receives the coupling 10 and an opposite open end 44' which is received in the pipe backup coupling 12. The backup coupling 12 has an open threaded end 46 which receives the end 44' of cylinder push guide 11 and a threaded end 42 which is threaded onto the pipe 44. The distal end of the pipe 44 has the pipe push coupling 13 threaded onto it to protect it from damage while being pushed.

When it is desired to push a pipe through the soil under a driveway or the like during installation, for example, of a gas main, a hole is dug at one side of the driveway. The length of pipe 44 is then attached to the pipe backup coupling 12 by threading it on. The cylinder backup plate 9 is moved to the pair of slots that are nearest the end 4. The pipe is threaded into the pipe backup coupling 12. The cylinder is then pressurized. Member 10 will enter member 12 which will push the pipe forward into the soil. When the cylinder 30 has been fully extended, it is retracted and member 11 is placed between member 10 and member 12. After another stroke of the piston, the cylinder backup plate is moved ahead to one of the notches 34 more remote from the end 4. The cylinder is then again pressurized and this procedure is repeated until the pipe is pushed entirely through the soil. Cylinder push guide 11 has a handle 50 attached to it by rod 51, by which it can be lifted.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A pipe pusher having a frame comprising two spaced parallel platelike members defining a space therebetween, a closure at one end of said frame, said closure being adapted to engage a vertical wall of earth, spaced transverse slots in the faces of said plate-like members adjacent each other, a cylinder backup plate adapted to be received in said slots and to be advanced along said frame from one said slot to another, a cylinder attached to said cylinder backup plate, said cylinder having a piston and a piston rod, said piston rod of said cylinder being attached to means for connecting said pusher to a pipe to be pushed whereby said cylinder will push said pipe into soil and may be advanced and said cylinder may be moved toward end of said frame to push said pipe further into said soil.

2. The pusher recited in claim 1 wherein spaced pairs of said slots are disposed in said plates whereby said backup plate may be moved from one pair of said slots to another pair of said slots and thereby adjust said backup plate toward said pipe.

3. The pusher recited in claim 2 wherein said pipe engaging member comprises an internally threaded member connected to said piston rod engaging a member adapted to receive a threaded end of said pipe to be pushed.

4. The pusher recited in claim 1 wherein said backup plate has a handle fixed to it whereby said plate can be lifted from said slot and moved to another said slot.

5. The pusher recited in claim 3 wherein a push guide is adapted to be disposed between said pipe and said piston rod, and a handle on said push guide for moving said push guide from between said pipe and said piston rod.

* * * * *